(12) United States Patent
Matsuda et al.

(10) Patent No.: US 8,318,364 B2
(45) Date of Patent: Nov. 27, 2012

(54) FUEL CELL SYSTEM

(75) Inventors: Hiroaki Matsuda, Osaka (JP);
Hideyuki Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 669 days.

(21) Appl. No.: 12/498,742

(22) Filed: Jul. 7, 2009

(65) Prior Publication Data

US 2010/0003561 A1    Jan. 7, 2010

(30) Foreign Application Priority Data

Jul. 7, 2008    (JP) .................................. 2008-177295

(51) Int. Cl.
*H01M 8/04*    (2006.01)
(52) U.S. Cl. ........................................ 429/413; 429/450
(58) Field of Classification Search .................. 429/413, 429/450
See application file for complete search history.

(56) References Cited

U.S. PATENT DOCUMENTS

| | | | |
|---|---|---|---|
| 6,656,620 B2 * | 12/2003 | Katagiri et al. | 429/413 |
| 6,936,361 B2 * | 8/2005 | Kelley et al. | 429/413 |
| 7,141,323 B2 * | 11/2006 | Ballantine et al. | 429/413 X |
| 7,687,164 B2 * | 3/2010 | Frost et al. | 429/413 |
| 8,034,494 B2 * | 10/2011 | Kelley et al. | 429/413 |

FOREIGN PATENT DOCUMENTS

| | | |
|---|---|---|
| JP | 2003-031254 | 1/2003 |
| JP | 2007-042445 | 2/2007 |

OTHER PUBLICATIONS

Computer-generated English translation of JP 2007-042445 (Takahashi), from the Japanese Patent Office website.*

* cited by examiner

*Primary Examiner* — Stephen J. Kalafut
(74) *Attorney, Agent, or Firm* — McDermott Will & Emery LLP

(57) ABSTRACT

A fuel cell system includes a fuel cell stack for generating power and power generation control means. The fuel cell stack has at least one cell that includes a cathode to which an oxidant is supplied, an anode to which a fuel is supplied, and a polymer electrolyte membrane sandwiched between the cathode and the anode. The power generation control means has dryness degree determination means for determining the degree of dryness of the fuel cell stack based on shut-down period. When the shut-down period is shorter than a predetermined period of time, the power generation control means supplies a gas for drying to the cathode for a predetermined period of time, to remove water remaining in the cathode. When the shut-down period is equal to or longer than the predetermined period of time, such a drying operation is not performed.

10 Claims, 4 Drawing Sheets

FUEL CELL SYSTEM

FIELD OF THE INVENTION

The invention relates to a fuel cell system using a polymer electrolyte membrane, and more particularly, to a fuel cell system including a control unit that controls so as to remove water remaining in a fuel cell stack before the start of power generation.

BACKGROUND OF THE INVENTION

It is desired to put polymer electrolyte fuel cells using a polymer electrolyte membrane into practical use as early as possible as the power source for households, power source for electric vehicles, and power source for mobile devices such as cell phones and notebook personal computers.

Polymer electrolyte fuel cells (hereinafter referred to as simply "fuel cells") have at least one cell including a membrane electrode assembly (hereinafter referred to as an "MEA") and a pair of separators. The MEA includes a polymer electrolyte membrane, an anode, and a cathode. The anode and the cathode each comprise a catalyst layer and a gas diffusion layer. The anode and the cathode are bonded to the main faces of the polymer electrolyte membrane so that they face each other with the polymer electrolyte membrane therebetween. Further, both faces of the MEA in the thickness direction thereof are sandwiched between the pair of separators.

In such a fuel cell, a fuel such as hydrogen and an oxidant such as air are supplied to the anode and the cathode, respectively, to generate power.

When a fuel cell is used as a power source, except when used for a small device such as a cell phone, the fuel cell is combined with air and fuel supply means and a power generation control means to form a fuel cell system. In such a fuel cell system, the fuel cell is specifically referred to as a fuel cell stack. The supply means supply a fuel to the anode and air to the cathode. For the supply means, for example, a blower or pump is used. The power generation control means controls the amount of power generated by the fuel cell stack, the temperature of the fuel cell stack, the supply of air and fuel, the stopping of the supply thereof, etc.

However, practical utilization of fuel cells has several problems to be solved.

One problem to be solved is long-term life characteristics.

The output of fuel cells gradually decreases with increasing power generation time. Fuel cells are required to maintain their output for a total of 40000 hours or more when used as the power source for households, and for a total of 5000 hours or more when used as the power source for mobile devices. At present, their life characteristics do not meet such requirements.

The output decrease is attributed to several factors, one of which is deterioration of air diffusion on the cathode side.

At the cathode, water is produced by electrode reaction as power is generated. In addition, when the fuel is hydrogen, both air supplied to the cathode and hydrogen supplied to the anode usually contain water, because they are humidified by a humidifier to suppress dry-out of the MEA and thus deterioration of the proton conductivity of the polymer electrolyte membrane. Thus, the air used as the oxidant also brings water to the cathode. Also, when the fuel is methanol, water contained in a methanol aqueous solution supplied to the anode moves to the cathode through the polymer electrolyte membrane. In this way, in either case, water accumulates in the cathode during power generation.

Such water accumulated in the cathode during power generation can cause deterioration of air diffusion in the cathode if it is not sufficiently removed.

In view of such problems, for example, Japanese Laid-Open Patent Publication No. 2003-031254 proposes a method for operating a fuel cell system in which after the power generation of the fuel cell is stopped, a gas for drying is supplied to the cathode for a predetermined period of time. This method intends to remove water remaining in the cathode with the dry gas having a low relative humidity.

Also, for example, Japanese Laid-Open Patent Publication No. 2007-042445 proposes another method for operating a fuel cell system. In this method, immediately before the power generation of the fuel cell is stopped, power is generated such that a large amount of water remains in the cathode, and after the power generation is stopped, a purge is performed with a gas of low humidity.

In order to prevent the MEA from becoming too dry as a result of a purge with a low humidity gas, this method intends to fully hydrate the MEA before stopping the power generation and remove only large droplets remaining in the air flow channel.

However, according to these operation methods, it is difficult to provide satisfactory long-term life characteristics required of fuel cells. That is, in these methods, a purge with a low humidity gas is performed whenever the power generation is stopped, regardless of the amount of water remaining in the MEA or cathode. These methods make the MEA too dry when the amount of water remaining in the MEA is small. Since fuel cell stacks are usually not sealed gas-tightly, the water accumulated in the cathode gradually evaporates and dissipates from the cells while the power generation is stopped. After the power generation is stopped for a certain period of time, the amount of water remaining in the MEA is small, and in such state, the amount of water accumulated in the cathode is not so large as to require drying by a purge. In such cases, these methods may make the MEA too dry.

When the polymer electrolyte membrane dries and its proton conductivity lowers, the output decreases temporarily until the electrolyte membrane is hydrated again, and, in addition, the electrode potentials vary significantly due to a large overvoltage. This can result in deterioration of the catalyst and electrolyte. Further, the use of air for each purge may further promote the deterioration of the catalyst and electrolyte since the cathode potential becomes high for an increased period of time.

Accordingly, although these operation methods may suppress the accumulation of water in the cathode, they will promote deterioration for other reasons.

The invention is achieved in view of the problems as discussed above, and an object of the invention is to provide a fuel cell system with excellent long-term life characteristics.

BRIEF SUMMARY OF THE INVENTION

In order to solve the above problems, the present inventors have diligently studied methods for operating fuel cell systems. As a result, they have found that it is only when power generation is resumed after a relatively short shut-down period that purging the cathode with a gas for drying permits efficient removal of water remaining in the cathode without making the MEA too dry. Based on the finding, they have completed the invention.

The invention is directed to a fuel cell system including a fuel cell stack for generating power and power generation control means for controlling the power generation of the fuel cell stack. The fuel cell stack includes at least one cell that includes a cathode to which an oxidant is supplied, an anode to which a fuel is supplied, and a polymer electrolyte membrane sandwiched between the cathode and the anode. The power generation control means has dryness degree determination means for determining the degree of dryness of the fuel cell stack when the fuel cell stack starts power generation. Based on the degree of dryness of the fuel cell stack determined by the dryness degree determination means, the power generation control means determines whether or not a predetermined drying operation for drying the fuel cell stack should be performed before the start of the power generation.

In a preferable embodiment of the invention, the dryness degree determination means determines the degree of dryness of the fuel cell stack by referring to at least one selected from the group consisting of shut-down period between the time the fuel cell stack stops power generation and the time it resumes power generation, temperature of the fuel cell stack, and humidity of the fuel cell stack.

In another preferable embodiment of the invention, the predetermined drying operation is to supply a gas for drying to the cathode for a predetermined period of time.

In another preferable embodiment of the invention, the oxidant is air, and the air is supplied to the cathode as the gas for drying. In this case, the fuel is preferably methanol.

In still another preferable embodiment of the invention, the oxidant is air, and the fuel cell system further includes a humidifier for humidifying the air, a humidified air supply system for supplying the air humidified by the humidifier to the cathode, and an air-for-drying supply system for supplying the air to the cathode as the gas for drying without humidifying it. In this case, the fuel is preferably hydrogen.

In still another preferable embodiment of the invention, the oxidant is air, and the fuel cell system further includes a humidifier for humidifying the air, a humidified air supply system for supplying the air humidified by the humidifier to the cathode, and purge gas supply means for supplying a purge gas to the cathode as the gas for drying. In this case, the purge gas is preferably an inert gas.

In the fuel cell system of the invention, only when the water accumulated in the cathode due to power generation does not sufficiently evaporate or dissipate during a shut-down period, the cathode is dried with a gas for drying. Therefore, the water remaining in the cathode can be removed only when necessary without making the MEA too dry. It is thus possible to suppress deterioration of air diffusion due to water accumulation in the cathode. Also, since the MEA does not become too dry, the deterioration of the catalyst and electrolyte is not promoted. These effects permit a significant improvement in the long-term life characteristics of the fuel cell system.

The application of the invention to a direct methanol fuel cell system using methanol as the fuel is particularly effective in improving long-term life characteristics, and stable supply of power becomes possible throughout the service life.

Also, since the fuel cell system of the invention has excellent long-term life characteristics, it is extremely useful, for example, as the power source for households, power source for electric vehicles, and power source for mobile devices.

Further, the fuel cell system of the invention is more preferably a direct methanol fuel cell system. In a direct methanol fuel cell system, air is used as the oxidant, and the air supplied to the cathode during power generation is not humidified. Thus, the air as the oxidant can be used as a gas for drying. Hence, there is no need to additionally use a supply means for supplying a gas for drying, which makes it possible to avoid an increase in the size of the fuel cell system.

Also, direct methanol fuel cell systems are mainly used as the power source for mobile devices. In such application, the power for supplying a gas for drying to the cathode before the start of power generation is supplied by the storage battery provided in combination. According to the invention, a gas for drying is supplied to the cathode before power generation only when necessary. As a result, the load on the storage battery can be significantly reduced. It is therefore possible to improve the long-term life characteristics and power generation efficiency of the whole system.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Referring now to drawings, embodiments of the invention are described.

Embodiment 1

Figure 1:
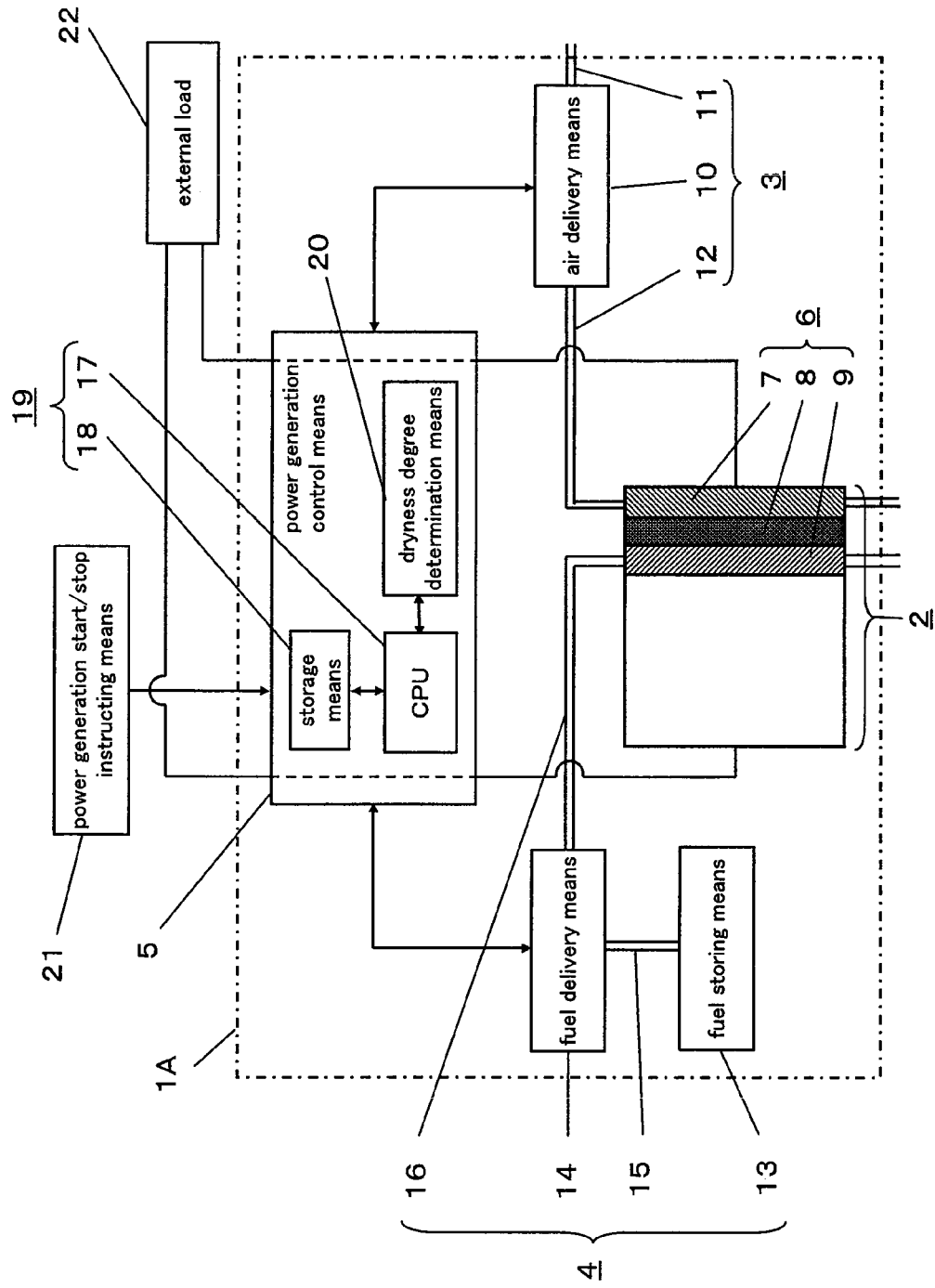
FIG. 1 is a block diagram schematically showing the configuration of a fuel cell system according to Embodiment 1 of the invention.

FIG. 1 shows the configuration of a fuel cell system 1A according to Embodiment 1 of the invention.

The system 1A includes a stack 2, an air supply means 3, a fuel supply means 4, and a power generation control means 5.

The stack 2 includes at least one cell 6. When a plurality of cells 6 are used, the cells 6 are connected in series for power generation. Each cell 6 includes a cathode 7, a polymer electrolyte membrane 8, an anode 9, and a pair of separators (not shown) disposed so as to sandwich the laminate of these components.

The cathode 7 comprises a catalyst layer and a gas diffusion layer, and the catalyst layer is formed so as to come in contact with a main face of the polymer electrolyte membrane 8. The catalyst layer can have a composition known in the field of fuel cells, and can contain, for example, a catalyst, a conductive material, and an electrolyte. The catalyst can be, for example, a noble metal such as Pt (platinum). The conductive material can be, for example, a carbon material. The gas diffusion layer can also have a composition known in the field of fuel cells, and can contain, for example, a conductive material. Examples of the gas diffusion layer include carbon non-woven fabric, carbon paper, and carbon cloth. Air is usually supplied to the cathode 7 as the oxidant by the air supply means 3.

The anode 9 comprises a catalyst layer and a gas diffusion layer, and the catalyst layer is formed so as to come into contact with the other main face of the polymer electrolyte membrane 8. The compositions of the catalyst layer and the gas diffusion layer are the same as those of the catalyst layer and gas diffusion layer of the cathode 7. A fuel is supplied to the anode 9 by the fuel supply means 4. The fuel can be one commonly used in the field of fuel cells, such as hydrogen or methanol. Among them, methanol is preferable in consideration of the effect of improving the life characteristics of the fuel cell system 1 and simplification of the system.

The polymer electrolyte membrane 8 is sandwiched between the cathode 7 and the anode 9. The polymer electrolyte membrane 8 can be one commonly used in the field of fuel cells. For example, a perfluorosulfonic acid type polymer membrane or hydrocarbon type polymer membrane can be used. It is also possible to use a commercially available polymer electrolyte membrane for a fuel cell. An example of commercial products is Nafion® (registered trademark of E.I. Dupont de Nemours and Company). These materials can also be used as the electrolyte contained in the catalyst layer.

The pair of separators is disposed so as to come into contact with the other faces of the cathode 7 and the anode 9 from the faces in contact with the polymer electrolyte membrane 8. One of the separators has an air flow channel on the face in contact with the cathode 7. The other separator has a fuel flow channel on the face in contact with the anode 9. The stack 2 may further include, for example, a pair of current collector plates, a pair of insulator plates, a pair of heaters, and a pair of end plates outside the outermost pair of separators.

The air supply means 3 includes: an air delivery means 10 that is controlled by the power generation control means 5 so as to supply air or stop the air supply; an air pipe 11 through which air is, for example, sucked in from the outside air by the air delivery means 10; and an air pipe 12 through which the air is supplied to the cathode 7 from the air delivery means 10. According to an air supply start signal sent from the power generation control means 5, the air delivery means 10 sucks in air (oxidant) through the air pipe 11 and supplies the sucked air to the cathode 7 of the cell 6 through the air pipe 12. Also, according to an air supply stop signal sent from the power generation control means 5, the air delivery means 10 stops the supply of the air to the cathode 7 of the cell 6. The air delivery means 10 can be, for example, a blower or air pump.

The fuel supply means 4 includes: a fuel storing means 13 for storing a fuel; a fuel delivery means 14 that is controlled by the power generation control means 5 so as to supply the fuel or stop the fuel supply; and fuel pipes 15 and 16. According to a fuel supply start signal sent from the power generation control means 5, the fuel delivery means 14 supplies the fuel stored in the fuel storing means 13 therefrom to the anode 9 of the cell 6. Also, according to a fuel supply stop signal sent from the power generation control means 5, the fuel delivery means 14 stops the supply of the fuel to the anode 9 of the cell.

The fuel storing means 13 is a container for storing a fuel, and can be, for example, a fuel cylinder or fuel tank. When the fuel cell system is used as a stationary power source for a household or the like, it is also possible to introduce a fuel from a supply source outside the fuel cell system without using the fuel storing means 13. The fuel delivery means 14 can be composed of, for example, a flow rate control unit, a fuel valve, and a fuel pump.

The power generation control means 5 includes: an information processing unit 19 comprising a microcomputer that includes a central processing unit (CPU) 17 and a storage means 18; and a dryness degree determination means 20 that determines the degree of dryness of the stack 2 or cathode 7 when power generation is started. A power generation start/stop instructing means 21, which is disposed outside the fuel cell system 1A, gives the power generation control means 5 an instruction to start power generation or stop the power generation. According to this instruction, the power generation control means 5 causes the fuel delivery means 14 and the air delivery means 10 to switch between the supply of fuel/air and the stop of the supply.

The storage means 18 can be a storage means commonly used in this field. Examples of such storage means include read only memory (ROM), random access memory (RAM), hard disk drive (HDD), and flash memory. The storage means 18 stores programs for performing various controls of the fuel cell system, numerical data used as the reference to start various controls, etc. Such numerical data can be set, for example, experimentally for each device that is actually used.

In Embodiment 1, the dryness degree determination means 20 measures the time between the time the stack 2 stops power generation and the time it resumes power generation, i.e., the shut-down period, to determine the degree of dryness of the stack 2 or cathode 7. The degree of dryness or wetness of the cathode 7 at the time of start of power generation can be estimated from the shut-down period, which varies according to how the fuel cell system is used. A commonly used timer can be used as the dryness degree determination means 20, and the shut-down period after the power generation is stopped is measured based on a time-storing program.

Upon receiving an instruction to start power generation from the power generation start/stop instructing means 21, the power generation control means 5 refers to information on the shut-down period from the dryness degree determination means 20. When the shut-down period is shorter than a predetermined period stored in the storage means 18 (reference value for determining the degree of dryness), the power generation control means 5 assumes that the degree of dryness of the cathode 7 is small, and performs a predetermined drying operation. That is, it actuates the air delivery means 10 and causes it to supply the air sucked through the air pipe 11 to the cathode 7 of the cell 6 through the air pipe 12, thereby drying the cell 6.

In the system 1A, when power is generated, the power generation control means 5 actuates the fuel delivery means 14 and causes it to supply the fuel from the fuel storing means 13 to the anode 9 of the cell 6 through the fuel pipes 15 and 16. Also, the power generation control means 5 actuates the air delivery means 10 and causes it to supply the air sucked from the outside air through the air pipe 11 to the cathode 7 through the pipe 12. When the stack 2 has a plurality of cells, the air and the fuel are supplied to the respective cells at the same time.

The power generated by the cell 6 of the stack 2 is supplied to an external load 22 through the power generation control means 5.

Upon receiving an instruction to stop power generation from the power generation start/stop instructing means 21, the power generation control means 5 stops the fuel delivery means 14 and the air delivery means 10, thereby stopping the power generation by the cell 6 and stopping the supply of power to the load 22. At this time, the dryness degree determination means 20 starts measuring the shut-down period, which is a parameter indicating the degree of dryness of the stack 2 or cathode 7.

Thereafter, when the power generation start/stop instructing means 21 gives the power generation control means 5 an instruction to start power generation, the CPU 17 obtains information on the shut-down period up to then from the dryness degree determination means 20, and compares the obtained information with the reference value for determining the degree of dryness stored in the storage means 18. When the power generation control means 5 determines that the shut-down period is shorter than the reference value for determining the degree of dryness, it actuates the air delivery means 10 of the air supply means 3 and causes it to supply the air sucked from the outside air to the cathode 7 of the cell 6 as the gas for drying, thereby evaporating the water contained in the cathode 7 for drying. Upon completion of the drying operation for a predetermined period of time, the power generation control means 5 actuates the fuel delivery means 14 of the fuel supply means 4 and causes it to supply the fuel to the anode 9, thereby starting the power generation by the stack 2 to supply power to the load 22.

When the power generation control means 5 determines that the shut-down period is longer than the reference value for determining the degree of dryness, it does not perform the above-described drying operation and, instead, actuates the air supply means 3 and the fuel supply means 4 and causes them to supply the air and the fuel to the stack 2 for power generation.

The reference value for determining the degree of dryness can be experimentally determined from the relation between the length of the shut-down period and the change in the state of wetness of the cathode 7. Generally, the reference value for determining the degree of dryness varies with the size and shape of the stack, the configuration and shape of the fuel cell system, how the power generation is controlled, etc. One example of usage patterns for which such reference value for determining the degree of dryness is set is one in which the shut-down period is shorter than 12 hours. In such cases, it is often necessary to perform the operation of drying the cathode 7 before the start of power generation.

It should be noted that common fuel cell systems are designed on the assumption that in most cases they are started up for power generation and shut down about once a day. That is, the long-term life characteristics of conventional fuel cell systems are designed for operational patterns which do not require frequent drying of the cathode 7 regardless of the stack shape and the like. Therefore, when a system is operated in an operational pattern requiring the drying of the cathode 7, which is different from the intended operational patterns, the system 1A illustrated in FIG. 1 is particularly effective in suppressing the deterioration of the long-term life characteristics.

As described above, the system 1A illustrated in FIG. 1 performs the predetermined drying operation when the shut-down period is equal to or less than a predetermined period, i.e., only when drying the cathode 7 before the start of power generation is necessary for improving the long-term life characteristics of the fuel cell. Thus, when the fuel cell is operated in an operational pattern which requires the drying of the cathode 7 before the start of power generation, the long-term life characteristics of the fuel cell can be improved, which is very useful.

Embodiment 2

Figure 2:
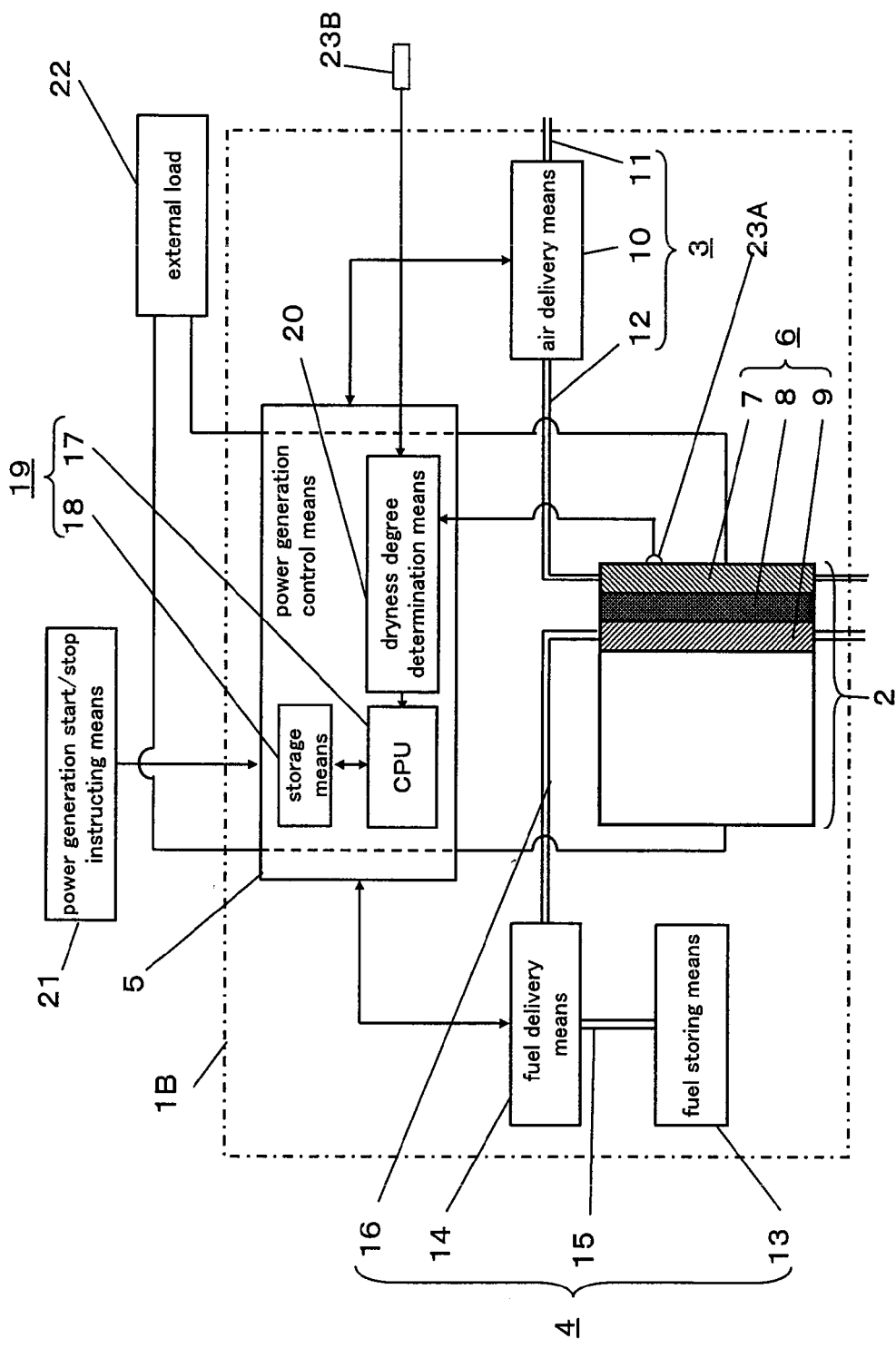
FIG. 2 is a block diagram schematically showing the configuration of a fuel cell system according to Embodiment 2 of the invention.

FIG. 2 shows the configuration of a fuel cell system 1B according to Embodiment 2 of the invention. The system 1B in this embodiment is different from the system 1A illustrated in FIG. 1 in that the operation at the time of start of power generation is controlled based on the relation between the temperature of the stack 2 and the state of dryness of the cathode 7. It should be noted that the temperature of the stack 2 lowers with time after the power generation is stopped.

Specifically, a temperature sensor 23A is installed on the cathode 7 of the cell 6, and the temperature of the stack 2 or cathode 7 which lowers with time after the power generation is stopped is measured by the dryness degree determination means 20. Also, a temperature sensor 23B for detecting the temperature of the outside air is installed outside the system 1B.

Predetermined temperature information is stored in the storage means 18 as a reference value for determining the degree of dryness. Upon receiving an instruction to start power generation from the power generation start/stop instructing means 21, the CPU 17 obtains temperature information detected by the temperature sensors 23A and 23B from the dryness degree determination means 20, and compares the obtained information with the reference value for determining the degree of dryness read from the storage means 18.

More specifically, the CPU 17 obtains information on the difference between the temperatures detected by the temperature sensors 23A and 23B from the dryness degree determination means 20. When it determines that the temperature of the cathode 7 detected by the temperature sensor 23A is higher than the temperature of the outside air detected by the temperature sensor 23B by more than the reference value for determining the degree of dryness, it determines that the shut-down period is not long enough to dry the cathode 7. As a result, the power generation control means 5 controlled by the CPU 17 actuates the air delivery means 10 and causes it to supply the air sucked through the air pipe 11 to the stack 2 through the air pipe 12, thereby drying the cathode 7. When the CPU 17 determines that the temperature difference is equal to or less than the reference value for determining the degree of dryness, it determines that the shut-down period is long enough to dry the cathode 7, and starts power generation without performing the above-described drying operation.

A thermistor, a thermocouple, a temperature-indicating resistor using a platinum wire, etc. can be used as the temperature sensors 23A and 23B.

Instead of the temperature sensors 23A and 23B, a humidity sensor may also be used. The relative humidity of the cathode 7 which decreases with time after the power generation is stopped is measured, and based on the measured humidity information, the supply of the gas for drying by the air supply means 3 is controlled. This configuration can also realize essentially the same function. In this embodiment, predetermined relative humidity determined based on the characteristics of decrease of relative humidity of the cathode 7 after the power generation stop is stored in the storage means 18 of the power generation control means 5 as a reference value for determining the degree of dryness. Upon receiving an instruction to start power generation, the CPU 17 obtains humidity information detected by the humidity sensor from the dryness degree determination means 20, and compares the obtained information with the reference value for determining the degree of dryness stored in the storage means 18. When the relative humidity of the cathode 7 is higher than the reference value for determining the degree of dryness, the power generation control means 5 actuates the air delivery means 10 and causes it to supply the gas for drying to the stack 2, thereby drying the cathode 7. This method can also provide essentially the same function as that described above.

A ceramic humidity sensor comprising a metal oxide or a polymer humidity sensor can be used as the humidity sensor.

In the direct methanol fuel cells illustrated in FIG. 1 and FIG. 2, it is preferable to use air as the gas for drying, and supply it by using the means for supplying air as the oxidant to the cathode during normal power generation. In this case, the effects of the invention can be obtained without increasing the complexity and size of fuel cell systems used as the power source for mobile devices.

Embodiment 3

Figure 3:
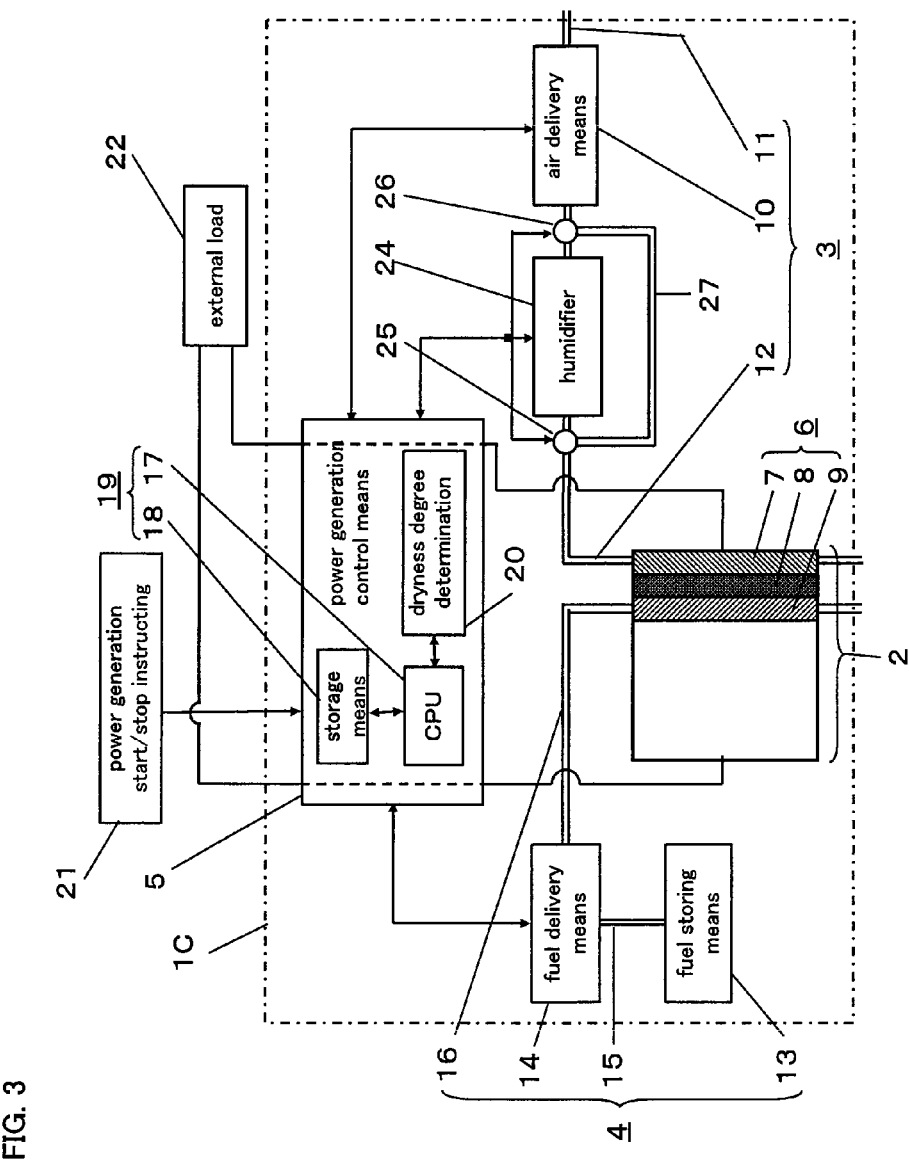
FIG. 3 is a block diagram schematically showing the configuration of a fuel cell system according to Embodiment 3 of the invention.

FIG. 3 shows the configuration of a fuel cell system 1C according to Embodiment 3 of the invention. The system 1C is different from the system 1A illustrated in FIG. 1 in that hydrogen is used as the fuel and that air supplied to the cathode 7 as the oxidant during normal power generation is humidified by a humidifier 24. That is, the humidifier 24 is disposed between the air delivery means 10 and the stack 2. Also, the system 1C is equipped with switch valves 25 and 26 for switching the air supplied to the stack 2 from the air delivery means 10 between air humidified by the humidifier 24 and non-humidified air, and a bypass pipe 27.

In the system 1C, when the shut-down period is shorter than a predetermined period of time, the power generation control means 5 switches the switch valves 25 and 26 so as to connect to the bypass pipe 27, so that non-humidified air is supplied to the cathode 7 for dehumidification from the air delivery means 10 through the bypass pipe 27. Thereafter, the power generation control means 5 switches the switch valves 25 and 26 so as to connect to the humidifier 24, so that the air from the air delivery means 10 passes through the humidifier 24 and the humidified air is supplied to the cathode 7.

Embodiment 4

Figure 4:
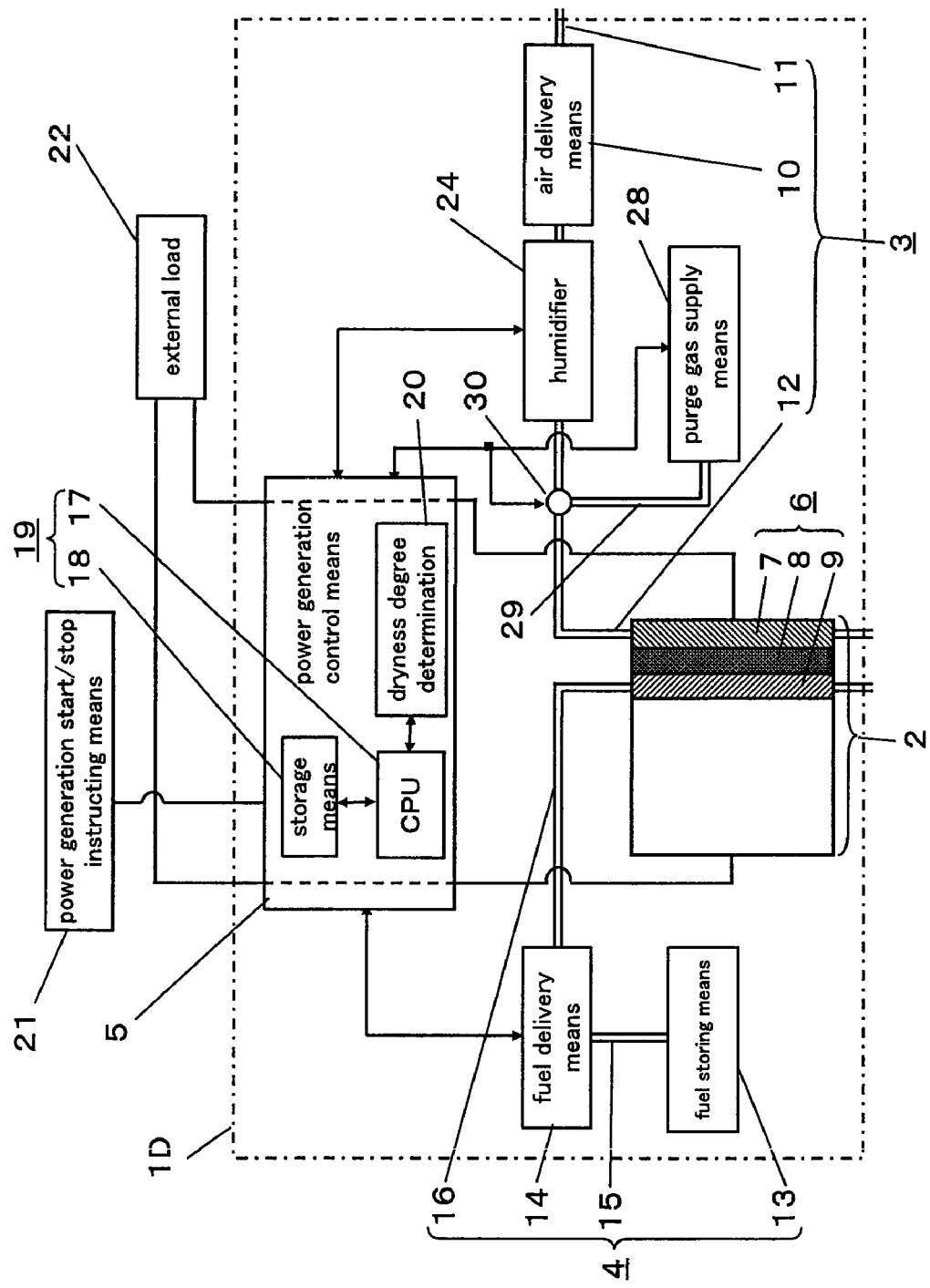
FIG. 4 is a block diagram schematically showing the configuration of a fuel cell system according to Embodiment 4 of the invention.

FIG. 4 shows the configuration of a fuel cell system 1D according to Embodiment 4 of the invention. The system 1D is different from the system 1C illustrated in FIG. 3 in that the air delivery means 10 is directly connected to the humidifier 24, and that a switch valve 30 is installed between the humidifier 24 and the cathode 7. The switch valve 30 switches the gas supplied to the cathode 7 between the purge gas supplied from a purge gas supply means 28 through a purge gas supply pipe 29 and the air supplied from the air delivery means 10 via the humidifier 24.

The purge gas supply means 28 has almost the same configuration as the fuel supply means 4, except that it includes a purge gas storing means instead of the fuel storing means. The purge gas is preferably an inert gas that does not damage the cathode 7, and recommended examples include nitrogen and argon. In this embodiment, also, in the case the interval between the time power generation is stopped and the time the next power generation operation is started is shorter than a predetermined period of time, i.e., the shut-down period is shorter than a predetermined period of time, the power generation control means 5, which is given an instruction to start power generation by the power generation start/stop instructing means 21, switches the switch valve 30 so as to connect to the purge gas supply means 28. As a result, the purge gas is supplied to the cathode 7 and the cathode 7 is dried. Upon completion of the drying operation for a predetermined period of time, the switch valve 30 is switched so as to connect to the humidifier 24, so that the air from the air delivery means 10 is humidified and then supplied to the cathode 7 for power generation.

Of course, the purge gas can be introduced from outside the system 1D.

The time for which the gas for drying is supplied to the cathode 7 to dry the cathode 7 varies according to the size and shape of the stack 2, the configuration and shape of the fuel cell systems 1A, 1B, 1C, and 1D, how power generation is controlled, etc. For example, the drying time is preferably set to 30 minutes or less. The drying of the cathode 7 is performed after an instruction to start power generation is received and before power generation is actually started. During such period, necessary power is supplied by a storage battery provided in combination or AC commercial power. Since finishing such operation in a minimal period of time is desirable, the drying of the cathode 7 needs to be finished in 30 minutes or less, and more preferably 10 minutes or less. In order to dry the cathode 7 in such a short period of time, it is necessary to appropriately control the supply speed of the gas for drying, the stack temperature, and the like. Such control conditions can be obtained experimentally.

When a direct methanol fuel cell is used as the fuel cell system of the invention, the long-term life characteristics significantly improve. When a direct methanol fuel cell is operated in a common operation method, the air diffusion in the cathode deteriorates significantly, compared with the case of using hydrogen as the fuel. Although detailed reasons for this are being diligently investigated, one reason is thought to be methanol crossover, in which methanol migrates from the anode to the cathode through the polymer electrolyte membrane. The crossover methanol in the cathode reacts for combustion to produce water, and the produced water promotes the accumulation of water in the cathode.

In the fuel cell systems of the invention, when the shut-down period is short, a gas for drying is supplied to the cathode to dry the cathode before the start of power generation. This can suppress degradation of the characteristics of the cathode and significantly improve the long-term life characteristics.

Examples of the invention are hereinafter described. The following Examples, however, are not to be construed as limiting the invention.

EXAMPLE 1

(Preparation of Catalyst Layer)

A catalyst ink was prepared by mixing 6 ml of a dispersion in which a cathode catalyst is dispersed in an isopropanol aqueous solution and 5 ml of a polymer electrolyte dispersion (5 wt % dispersion of Nafion® (registered trademark of E.I. Dupont de Nemours and Company) available from Sigma-Aldrich Japan K.K.). This catalyst ink was applied onto a polytetrafluoroethylene (PTFE) sheet, and dried to form a cathode catalyst layer. The cathode catalyst was ketjen black (Carbon ECP (trade name) available from Ketjen black International Company Ltd.) carrying 50 wt % of a Pt catalyst.

An anode catalyst layer was prepared in the same manner as described above, except for the use of an anode catalyst instead of the cathode catalyst. The anode catalyst was ketjen black (carbon ECP) carrying 50 wt % of a Pt—Ru catalyst (atomic ratio Pt:Ru=1:1).

(Preparation of Gas Diffusion Layer)

An ink for forming a gas diffusion layer was prepared by dispersing and mixing acetylene black (DENKA BLACK® (registered trademark of Denki Kagaku Kogyo K.K.) available from Denki Kagaku Kogyo K.K.) and a PTFE dispersion (reagent, solid content 60% by weight, available from Sigma-Aldrich Japan K.K.) in ion-exchange water. This ink was applied onto one side of a carbon paper (AvCarb® (registered trademark of Ballard Material Products Inc.) 1071HCB (trade name) available from Ballard Material Products Inc.) and dried to form a cathode gas diffusion layer.

An anode gas diffusion layer was prepared in the same conditions as those described above, except for the use of TGP-H-090 (trade name) of Toray Industries Inc. as the carbon paper instead of AvCarb® 1071HCB.

(Production of Mea and Cell)

A polymer electrolyte membrane (Nafion® (registered trademark of E.I. Dupont de Nemours and Company) 112 (trade name) available from E.I. Dupont de Nemours and Company) is sandwiched between the cathode catalyst layer and the anode catalyst layer. This laminate was hot pressed and the PTFE sheets were pulled out, so that the catalyst layers were transferred to the polymer electrolyte membrane. Further, the cathode gas diffusion layer was laminated on the cathode catalyst layer, and the anode gas diffusion layer was laminated on the anode catalyst layer. This laminate was hot pressed to produce an MEA.

On each side of the MEA, a rubber gasket was fitted to the peripheral area of the polymer electrolyte membrane to which the electrode (catalyst layer+gas diffusion layer) was not bonded. Subsequently, the MEA was sandwiched between a pair of graphite separators, a pair of current collector plates, a pair of rubber heaters, a pair of insulator plates, and a pair of end plates in this order for lamination, and a thermocouple was fitted to one of the separators. In this way, a cell was produced.

The cell was combined with an air supply means, a fuel supply means, a power generation control means, and a dryness degree determination means, to form a fuel cell system of this example. An air pump was used as the air delivery means. A 1 mol/L methanol aqueous solution was used as the fuel. A fuel tank was used as the fuel storing means, and a fuel pump was used as the fuel delivery means. Also, an electronic load unit was used as the external load that consumes power generated by the fuel cell system. As the dryness degree determination means, the shut-down period was measured manually instead of a timer.

This fuel cell system was tested by the following operation method to evaluate the long-term life characteristics.

Before the start of power generation, only air was supplied for 10 minutes. Upon the start of power generation, the supply of the fuel and the heating by the heaters were started. The fuel cell system was continuously operated to supply power to the electronic load unit at a constant current of 150 mA/cm$^2$ for 60 minutes. At this time, the cell temperature was maintained at 60° C., the air utilization rate was set to 50%, and the fuel utilization rate was set to 70%. It should be noted that the same air flow rate was employed in supplying air before the start of power generation. In stopping the power generation, the supply of air and fuel and the heaters were stopped. In this state, the fuel cell system was shut down for 60 minutes. This cycle, consisting of 10-min air supply, 60-min power generation, and 60-min shutdown, was repeated. However, at nighttime, the power generation was stopped, and only when the power generation was resumed the next morning, the 10-min air supply was not performed before the start of 60-min continuous power generation. In this way, a total of 500 cycles were applied to conduct a power generation test. The ratio of the average voltage at the 500$^{th}$ cycle to the average voltage at the 1$^{st}$ cycle was calculated as the life characteristic retention rate to evaluate the state of deterioration. Table 1 shows the result.

EXAMPLE 2

A fuel cell system was produced in the same manner as in Example 1. The temperatures of the cell and the outside air during the shut-down period were measured manually as the dryness degree determination means.

An evaluation test was conducted in the same manner as in Example 1, except that in the operation method of the fuel cell, after the power generation was stopped, the shut-down was continued until the cell temperature reached a temperature 5° C. higher than the temperature of the outside air. The average shut-down period was 50 minutes. Table 1 shows the result.

EXAMPLE 3

A fuel cell system was produced in the same manner as in Example 1, except that humidity sensors were installed on the outside of the cell and the cathode outlet as the dryness degree determination means, and that the relative humidities of the outside air and the cathode during the shut-down period were measured manually.

An evaluation test was conducted in the same manner as in Example 1, except that in the operation method of the fuel cell, after the power generation was stopped, the shut-down was continued until the relative humidity of the cathode of the cell reached a humidity 5% higher than the relative humidity of the outside air. The average shut-down period was 70 minutes. Table 1 shows the result.

EXAMPLE 4

A cell was produced in the same manner as in Example 1. The cell was combined with an air supply means, a fuel supply means, a power generation control means, a dryness degree determination means, and a means for supplying a gas for drying, to form a fuel cell system of this example. An air pump was used as the air delivery means, and an air pipe was fitted with a humidifier. Hydrogen was used as the fuel, and a gas cylinder was used as the fuel storing means. A flow rate controller was used as the fuel delivery means, and a fuel supply pipe was fitted with a humidifier. Also, an electronic load unit was used as the external load that consumes power generated by the fuel cell system. As the dryness degree determination means, the shut-down period was measured manually. The air pump was used also as the means for supplying a gas for drying, and the air supply pipe was provided with a supply pipe bypassing the humidifier, and these pipes were switched with switch valves.

An evaluation test was conducted in the same manner as in Example 1, except that in the operation method of the fuel cell, these pipes were switched manually using the switch valves so that the pipe bypassing the humidifier was used in the drying operation before the start of power generation, while the pipe passing through the humidifier was used in supplying air as the oxidant during power generation. Table 1 shows the evaluation.

EXAMPLE 5

Nitrogen (purge gas) was used as the gas for drying, and a gas cylinder was used as the nitrogen storing means. A flow rate controller was used as the nitrogen delivery means, and a nitrogen pipe was connected to the air pipe via a switch valve downstream of the humidifier.

An evaluation test was conducted in the same manner as in Example 1, except that in the operation method of the fuel cell, these pipes were switched manually using the switch valve so that nitrogen was supplied to the cathode 7 in the drying operation before the start of power generation, while humidified air was supplied to the cathode 7 as the oxidant during power generation. Table 1 shows the result.

COMPARATIVE EXAMPLE 1

A fuel cell system was produced in the same manner as in Example 1.

An evaluation test was conducted in the same manner as in Example 1, except that in the operation method of the fuel cell, the gas for drying was not supplied before the start of power generation. Table 1 shows the result.

COMPARATIVE EXAMPLE 2

A fuel cell system was produced in the same manner as in Example 4.

An evaluation test was conducted in the same manner as in Example 4, except that in the operation method of the fuel cell, the gas for drying was not supplied before the start of power generation. Table 1 shows the result.

COMPARATIVE EXAMPLE 3

A fuel cell system was produced in the same manner as in Example 1.

An evaluation test was conducted in the same manner as in Example 1, except that in the operation method of the fuel cell, the shut-down period was set to 12 hours. Table 1 shows the result.

REFERENCE EXAMPLE

A fuel cell system was produced in the same manner as in Example 1.

An evaluation test was conducted in the same manner as in Example 1, except that in the operation method of the fuel cell, the shut-down period was set to 12 hours and that the air supply before the start of power generation was not performed.

Table 1 summarizes the results of these Examples, Reference Example, and Comparative Examples.

TABLE 1

|  | Fuel | Shut-down period | Medium for drying cathode | Life characteristic retention rate (%) |
| --- | --- | --- | --- | --- |
| Example 1 | Methanol | 60 min | Air | 95 |
| Example 2 |  | Average 50 min |  | 94 |
| Example 3 |  | Average 70 min |  | 96 |
| Example 4 | Hydrogen | 60 min | Air | 97 |
| Example 5 |  |  | Nitrogen | 97 |
| Comparative Example 1 | Methanol | 60 min | None | 48 |
| Comparative Example 2 | Hydrogen |  |  | 61 |
| Comparative Example 3 | Methanol | 12 hr | Air | 73 |
| Reference Example |  |  | None | 89 |

Table 1 clearly shows that Comparative Examples 1 and 2, in which the shut-down period is short, have significantly low life characteristics, compared with Reference Example, in which the shut-down period is long. In contrast, Examples 1 to 5, in which the cathode was dried with the gas for drying before the start of power generation, have significantly improved life characteristics. These results clearly indicate that deterioration of air diffusion can be suppressed in operational patterns in which power generation is stopped and after a relatively short shut-down period it is resumed.

In Comparative Example 3, the shut-down period was made long and, in addition, the cathode was dried before the start of power generation. According to this operation method, the life characteristic was low, compared with Reference Example. This is probably because the cathode that had fully dried during the long shut-down period was further dried before the start of power generation, and this further drying promoted the deterioration of the catalyst, electrolyte, and the like. This result suggests that when the shut-down period is long, it is better not to perform further drying to avoid deterioration of life characteristics.

Comparative Example 1, which uses methanol as the fuel, has a lower life characteristic than Comparative Example 2, which uses hydrogen as the fuel. Contrary to this, Examples 1 and 4 have very good life characteristics although they use methanol as the fuel. This indicates that the application of the invention to direct methanol fuel cells is more effective.

The above results clearly indicate that the fuel cell systems of the invention can provide polymer electrolyte fuel cell systems including direct methanol fuel cell systems which have good long-term life characteristics.

The fuel cell systems of the invention, having excellent long-term life characteristics, are useful as the power source for households, power source for electric vehicles, and power source for mobile devices such as notebook personal computers.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:
1. A fuel cell system comprising:
a fuel cell stack for generating power, the fuel cell stack including at least one cell that comprises a cathode to which an oxidant is supplied, an anode to which a fuel is supplied, and a polymer electrolyte membrane sandwiched between the cathode and the anode;
dryness degree determination means for determining a degree of dryness of the fuel cell stack when the fuel cell stack starts power generation; and
means for controlling the fuel cell system based on the degree of dryness of the fuel cell stack determined by the dryness degree determination means, for determining whether or not a predetermined drying operation for drying the fuel cell stack should be performed before the start of the power generation, and for, upon determining the predetermined drying operation should be performed before the start of the power generation, causing the fuel cell system to perform the predetermined drying operation before the start of the power generation.
2. The fuel cell system in accordance with claim 1, wherein the dryness degree determination means determines the degree of dryness of the fuel cell stack by referring to at least one selected from the group consisting of shut-down period between the time the fuel cell stack stops power generation and the time it resumes power generation, temperature of the fuel cell stack, and humidity of the fuel cell stack.
3. The fuel cell system in accordance with claim 1, wherein the predetermined drying operation is to supply a gas for drying to the cathode for a predetermined period of time.
4. The fuel cell system in accordance with claim 3, wherein the oxidant is air, and the air is supplied to the cathode as the gas for drying.

5. The fuel cell system in accordance with claim 4, wherein the fuel is methanol.

6. The fuel cell system in accordance with claim 3, wherein the oxidant is air, and the fuel cell system further includes a humidifier for humidifying the air, a humidified air supply system for supplying the air humidified by the humidifier to the cathode, and an air-for-drying supply system for supplying the air to the cathode as the gas for drying without humidifying the gas.

7. The fuel cell system in accordance with claim 6, wherein the fuel is hydrogen.

8. The fuel cell system in accordance with claim 3, wherein the oxidant is air, and the fuel cell system further includes a humidifier for humidifying the air, a humidified air supply system for supplying the air humidified by the humidifier to the cathode, and purge gas supply means for supplying a purge gas to the cathode as the gas for drying.

9. The fuel cell system in accordance with claim 8, wherein the purge gas is an inert gas.

10. The fuel cell system in accordance with claim 1, wherein:
the means for controlling power generation of the fuel cell stack and for controlling the fuel cell system includes a processor and a storage medium storing a program,
the program, when executed by the processor, causes the processor to control the fuel cell system based on the degree of dryness of the fuel cell stack determined by the dryness degree determination means, and to determine whether or not a predetermined drying operation for drying the fuel cell stack should be performed before the start of the power generation.

* * * * *